Figure 3:
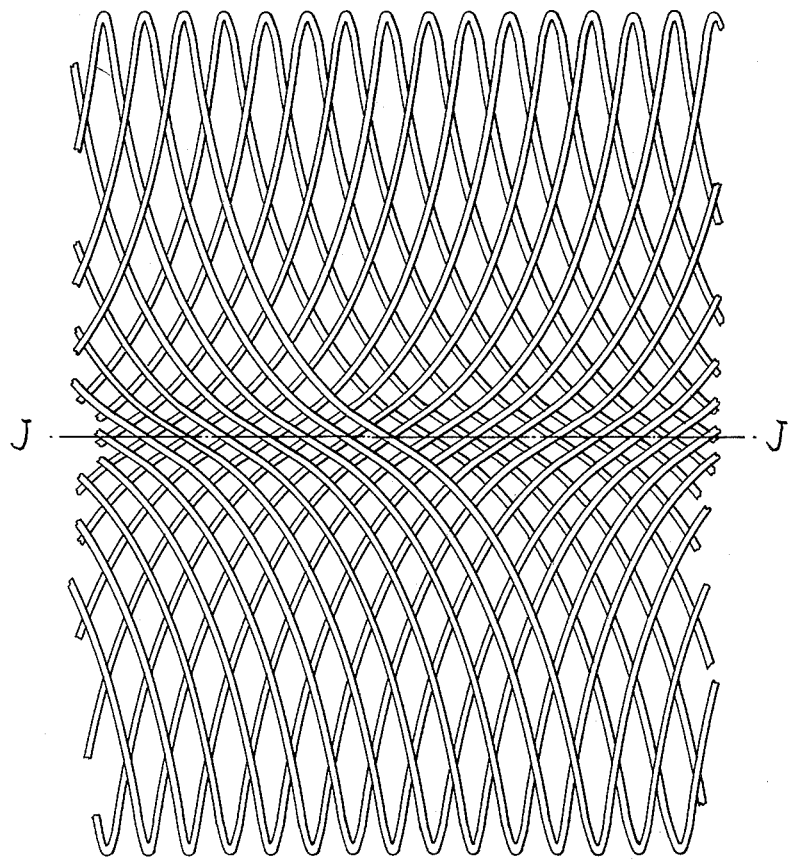

March 13, 1962 R. S. J. SMITH ETAL 3,024,828
PNEUMATIC TIRES
Filed June 28, 1955 4 Sheets-Sheet 1
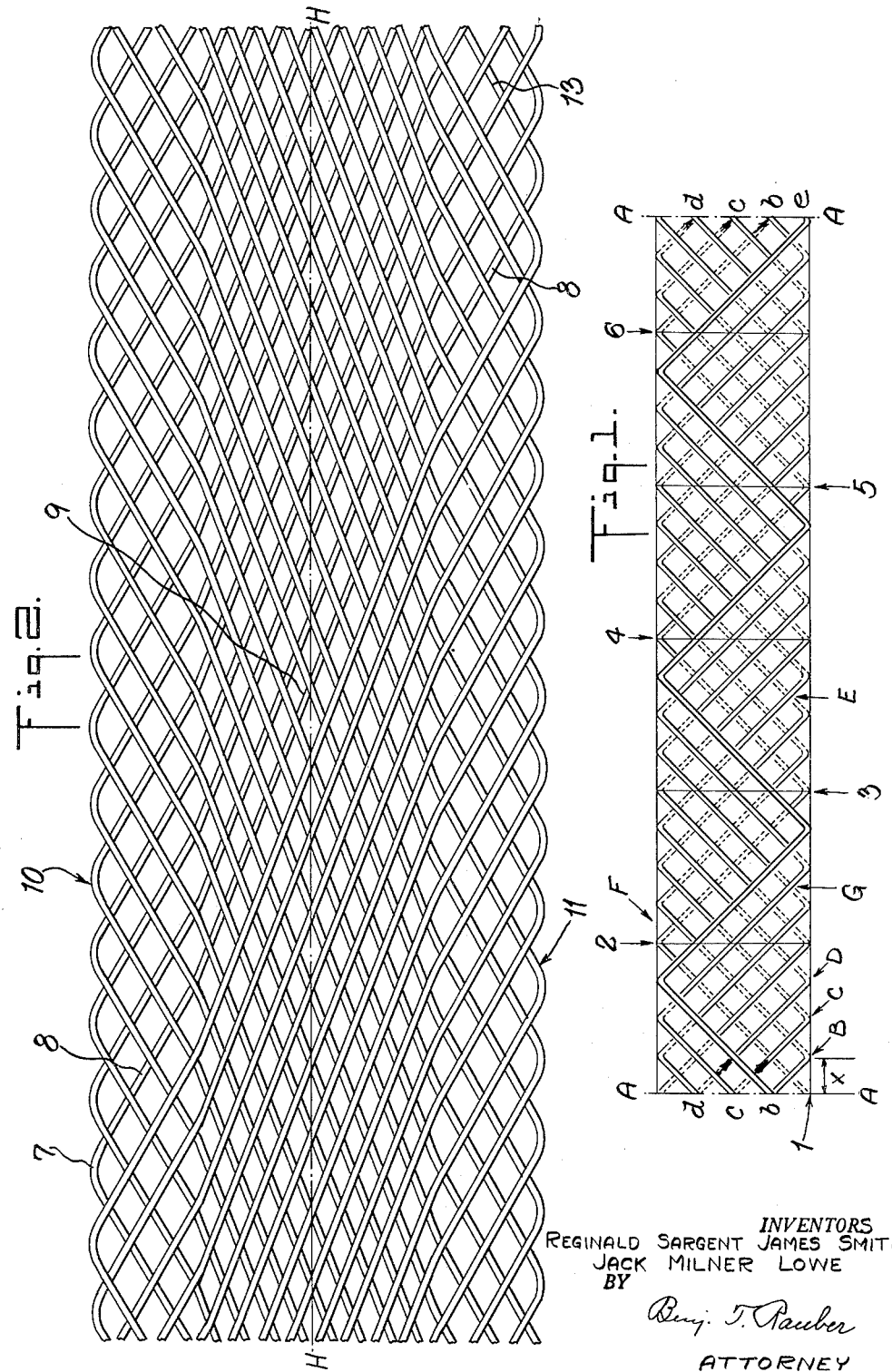
INVENTORS
REGINALD SARGENT JAMES SMITH
JACK MILNER LOWE
BY
Benj. T. Rauber
ATTORNEY March 13, 1962 R. S. J. SMITH ETAL 3,024,828
PNEUMATIC TIRES
Filed June 28, 1955 4 Sheets-Sheet 2

INVENTORS
REGINALD SARGENT JAMES SMITH
JACK MILNER LOWE
BY
Benj. T. Rauber
ATTORNEY March 13, 1962  R. S. J. SMITH ETAL  3,024,828
PNEUMATIC TIRES
Filed June 28, 1955  4 Sheets-Sheet 3
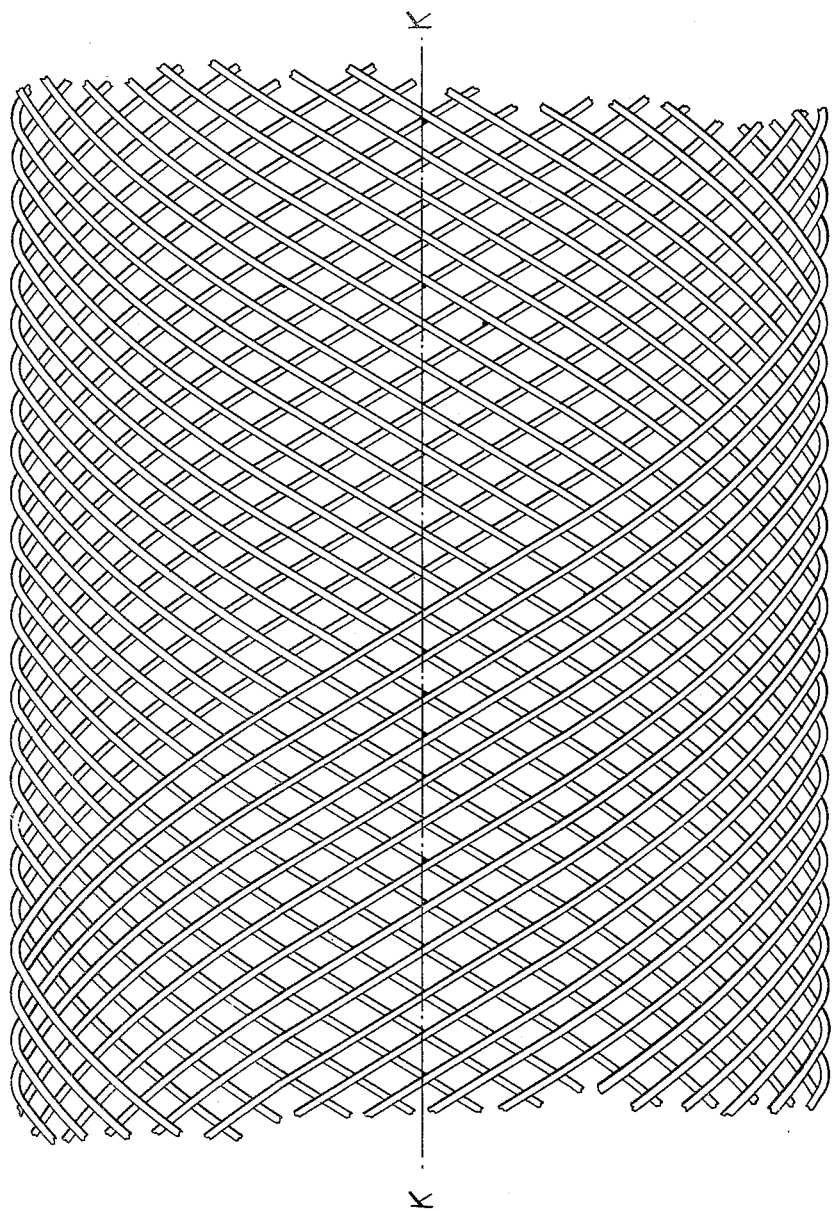
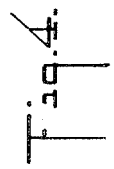
INVENTORS
REGINALD SARGENT JAMES SMITH
JACK MILNER LOWE
BY
*Benj. T. Rauber*
ATTORNEY

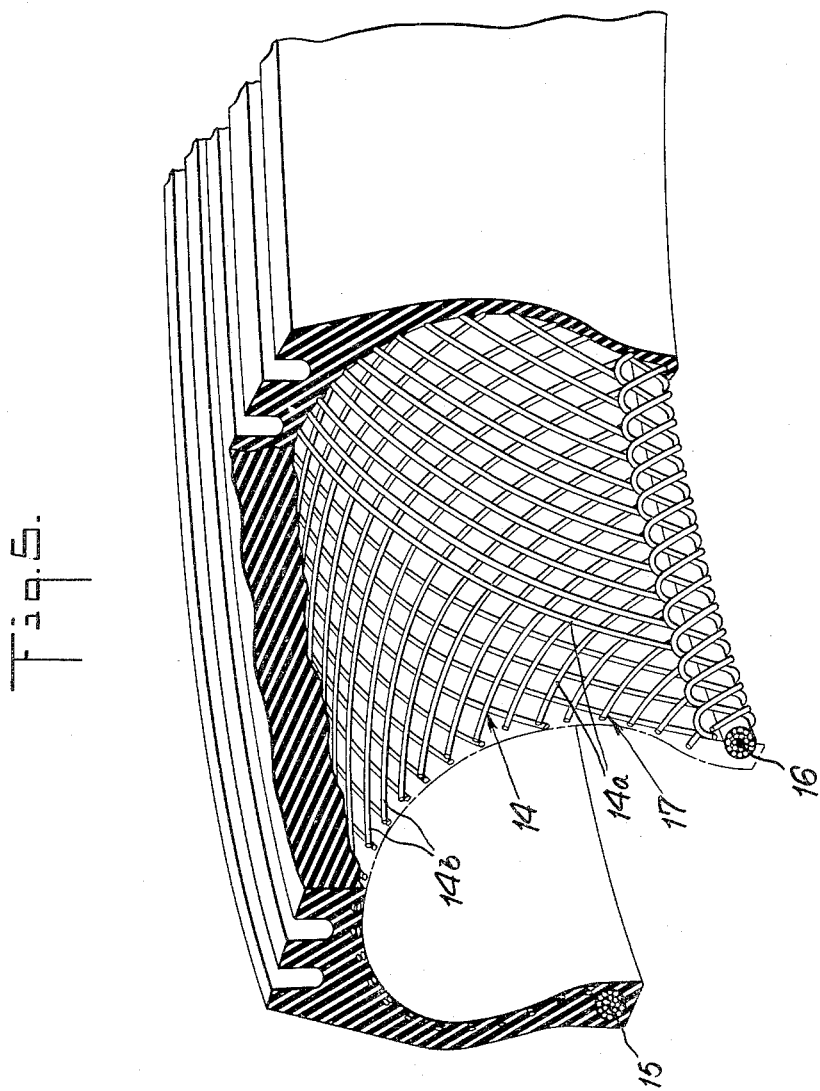

United States Patent Office 3,024,828
Patented Mar. 13, 1962

3,024,828
PNEUMATIC TIRES
Reginald Sargent James Smith, Streetly, and Jack Milner Lowe, Sutton Coldfield, England, assignors to Dunlop Tire and Rubber Corporation, Buffalo, N.Y., a corporation of New York
Filed June 28, 1955, Ser. No. 518,518
Claims priority, application Great Britain June 29, 1954
5 Claims. (Cl. 152—354)

Our invention relates to pneumatic tires and more particularly to wound reinforcements and to tire covers incorporating such reinforcements.

Our invention provides a pneumatic tire having a tread portion capable of high resistance to wear and of improved high speed running characteristics when compared with similar types of tires proposed heretofore.

According to the invention a pneumatic tire cover reinforcement comprises a band formed from convolutions of a filamentary material progressively wound obliquely from one side of the band to the other and back in zig-zag formation, successive convolutions being slightly displaced so that they are distributed substantially uniformly around the band and the finished band having at any transverse cross-section an inner surface of parallel lengths of filamentary material lying obliquely and in an opposed direction to adjacent superposed parallel lengths of filamentary material forming an outer surface.

The lengths of filamentary material extending obliquely from one side of the band to the other may be inclined along their whole extent at a constant angle relative to the mid-circumferential plane of the reinforcement and the angle is preferably 30° though normally it should not be lower than 20°.

Alternatively the said lengths of filamentary material may each be inclined at a different angle along a part or parts of its length compared with the angular disposition of the remainder of its lengths, that is, each length of filamentary material may be inclined at 20° to the mid-circumferential plane for a portion extending for about ⅔ of its length and mid-way between its ends, that is, to form a mid-zone containing the filamentary material at this angle, each end being inclined at 30° to the mid-circumferential plane to form a side zone of this inclination at each side of the mid zone. The angles referred to are the angles made by the lengths of filamentary material during the winding of the reinforcement. These angles are changed when the tire is subsequently subjected to a forming operation as will be explained in greater detail later in the specification.

According to the invention also a pneumatic tire cover incorporates a reinforcement comprising a band formed from filamentary material arranged in the manner referred to in the preceding paragraphs.

Further, in accordance with the invention, a pneumatic tire comprises a carcass having a breaker reinforcement comprising a band formed from filamentary material arranged in the manner referred to in the said preceding paragraphs.

The invention will now be described, by way of example, reference being had to the accompanying drawings, in which, FIG. 1 is a diagrammatic representation of a reinforcement for a pneumatic tire shown severed along the chain-dotted line A—A and laid flat upon the winding surface of a former also laid flat;

FIGS. 2–4 are diagrammatic part plan views of alternative forms of reinforcements, laid flat; and FIG. 5 is a diagrammatic perspective view of part of a pneumatic tire.

The diagrammatic plan view illustrated in FIG. 1 will first be described in order to indicate the principle embodied in the wound reinforcement bands forming the subject matter of the invention.

The winding of filamentary material commences at the point 1 shown in FIG. 1 on the left-hand side E of a former G shown with its winding surface laid flat. The winding then progresses in a straight line path to the right-hand side F of the former G to a point 2. The direction of winding then changes and the filamentary material is laid in a straight line path back to the side E of the former which it meets at the point 3. The winding continues in zig-zag progress across and around the surface of the former to successive points 4, 5 and 6 from which point it passes through the point $b$ across to the side E of the former to the point B which is advanced in the direction of winding from the point 1 by one pitch, (the extent of which is indicated by reference character $x$, FIG. 1), the winding having completed a single convolution, each convolution comprising substantially three phases (that is, a progression from one side of the band to the other side and then back).

The second convolution commences at B and passes through the point $c$ back to the side E of the former to the point marked C from which point the third convolution commences and passes through the point marked $d$ to point D, succeeding convolutions being similarly wound until the band is completed at the point marked $e$.

It will be noted, with reference to FIG. 1, that the convolutions are uniformly distributed around the band and, in the finished winding, convolutions are overlapped by succeeding convolutions so that parts of each convolution, excepting the last convolution, lie beneath parts of other convolutions, this feature being illustrated by showing the superposed parts with full lines and the parts which lie beneath with dotted lines.

The finished band has, therefore, at any transverse cross-section an inner surface of parallel lengths of filament lying obliquely and in an opposed direction to adjacent superposed parallel lengths of filament forming an outer surface.

The inner and the outer surfaces each comprise groups of parallel lengths of filaments, the lengths of filaments in each group being disposed at an oppositely inclined angle to the adjacent groups alongside and on the opposite surface of the band and the lengths of filaments in each group on either of the surfaces extending beneath an adjacent group of filaments to form a group on the other surface of the band, the said lengths of filaments thus being interwoven.

The reinforcement illustrated in FIG. 2 is of a tire breaker comprising a band wound on a machine of the type described in our co-pending application Ser. No. 560,648, filed January 23, 1956, a cylindrical former having a flat winding surface being utilized.

A continuous length of stranded rubberized wire cord, made up from a plurality of steel wires, is used. Commencing at a given point 7 on the right-hand side (indicated by 10) of the former, the length of the cord passes therefrom to the left-hand side (indicated by 11) of the former, a quarter of the length of cord 8 at each end being inclined at 28° to the mid-circumferential plane H—H (shown chain dotted) of the reinforcement while the intermediate portion 9 is disposed at 22° to the said plane. The cord then progresses from the left-hand side 11 of the band back again to the right-hand side 10, a quarter 13 of this length of cord at each end being inclined at 28° to said plane but inclined in an opposed sense to the previously mentioned length of cord inclined at the same nominal angle. The intermediate portion of this length (not shown) is inclined at 22° to the said plane but also in an opposed sense to the previously mentioned intermediate portion.

The cord thus progresses obliquely from one side of the band to the other and back in zig-zag formation until a complete revolution has been wound, the cord having then, in this instance, completed approximately three phases.

The lengths of cord in the next convolution are located alongside the lengths of cord forming the first-mentioned convolution, the lengths in this second convolution, as in the winding shown in FIG. 1, lying slightly in advance of those in the first-mentioned convolution.

The complete band is formed from a plurality of such convolutions, substantially in the manner already described.

The breaker is applied to a previously built carcass, which has either been built on a profiled former or has been built on a flat former and then roughly shaped by means of a lightly inflated air bag. The breaker is applied so that the mid-circumferential plane H—H of the breaker coincides with the mid-circumferential plane of the carcass. After the application of the tread rubber, the assembled tire cover is located in a mold and cured under heat and pressure.

When the breaker is applied to the carcass, the circumferentially extending edges thereof are adhered in position by the tackiness of the rubber forming part of the carcass. In view of the fact that these edges take up a position on a circle of smaller diameter than the diameter of the surface upon which they are formed the angle of the lengths of cords adjacent to these edges increases from 28° to between 35° and 40°. Subsequent to forming and vulcanization, however, in view of the fact that the crown of the carcass increases in diameter (by about 3%) during this operation and that the breaker simultaneously decreases in width, the angle decreases to a final figure of between 12° to 14°.

It is possible, therefore, by correctly choosing the initial angles at which the lengths of cord adjacent to the edges of the band are disposed relative to the mid-circumferential plane, to obtain the desired final angle of disposition of the cords which will confer on the tire the required performance characteristic despite the change of angle during the forming and molding operations.

Although the angle of the intermediate portions of the lengths of cord is not so susceptible to variations under the above conditions, compensation may similarly be effected for any variations which are found to occur.

In an alternative arrangement, the reinforcement may be wound as shown diagrammatically in FIG. 1, each of the lengths of cord being inclined along its whole extent to a constant angle of 30° relative to the mid-circumferential plane of the reinforcement.

Other angular dispositions of the cord are envisaged, for example, in a reinforcement for use as a carcass reinforcement to extend substantially from bead to bead, the lengths of cord at each end constitute sidewall reinforcing portions disposed at about 90° to the mid-circumferential plane of the reinforcement, the center portion of each length constituting a tread reinforcing portion and being disposed at 30° to the said plane.

In an alternative carcass reinforcement the construction is such that, in the tread reinforcing portion of the reinforcement, each end of each part length is inclined at 60° to the mid-circumferential plane, the remainder being inclined at 30° to the said plane.

Preferably, as described above, the complete reinforcement is formed from a single steel cord to minimize the number of free ends which are inevitable in the case of plies cut from lengths of steel cord fabric, the cut ends usually being parts of the cord to which the rubber does not adhere.

The invention is not, however, limited to reinforcements of steel cord fabric but includes reinforcements made from any suitable filamentary material, that is, cotton, silk, flax, rayon, nylon or the polyester sold under the registered trademark "Terylene." Such cords are preferably rubber covered prior to the winding of the band. They may, alternatively be of any metal other than steel having a suitable modulus of elasticity or even a combination of metal and non-metallic cords may be used.

A soft rubber compound (Shore hardness when vulcanized not exceeding 65°) may be used with wire to act as a cushion to prevent the direct transmission to the interface between the rubber compound and the metal of the very high local stresses (whether tension, compression or shear) developed on the deflection of the tire cover during running. Soft rubber also makes very intimate contact with the metal, to give very good adhesion.

The reinforcement may be formed in true cylindrical shape, or alternatively, may be somewhat barrel-shaped.

In the embodiments earlier referred to, the lengths of cord are inclined as they pass from one side of the band to the other, at one angle or alternatively at more than one angle to the mid-circumferential plane of the band.

The lengths of cord may, however, be wound along curved path, for example, as shown in FIGS. 3 and 4.

FIG. 3 shows a reinforcement, the cords of which follow paths of a cycloidal nature, the cords making low angles with the mid-circumferential plane J—J at the central portion of the reinforcement and high angles with a circumferential line crossing the said cords at the side portions of the reinforcement.

FIG. 4 shows a reinforcement, the cords of which follow paths of a sinusoidal nature, the cords making high angles with the mid-circumferential plane K—K at the central portion of the reinforcement and low angles with a circumferential line crossing the said cords at the side portions of the reinforcement. By suitable choice of angles, a winding of the type shown in FIG. 4 can be made to produce, after shaping, a reinforcement in which the cords lie in geodesic paths.

It will be appreciated that although the reinforcement shown in FIG. 1 is made up of convolutions in each of which the cord completes approximately three phases of zig-zag movement, reinforcements according to the invention may be constructed of convolutions having any other number of phases or half phases. Further, although in the windings described successive convolutions lie in advance one of the other, in alternative constructions, successive convolutions may lie slightly behind one another.

FIG. 5 shows an example of the use of a reinforcement according to the invention as a carcass reinforcement. To produce a carcass reinforcement, the band is wound on a former of U-shaped cross-section or is wound on a cylindrical former and subsequently shaped. In the finished tire shown in FIG. 5 the reinforcement 14 extends between beads 15 and 16 of a tire carcass 17, the portions 14c of the reinforcement being turned up around the bead wires. The lengths of cord 14a constitute sidewall reinforcing portions and the lengths of cord 14b constitute tread-reinforcing portions.

Having described our invention, what we claim is:

1. A pneumatic tire having a tread portion and a breaker strip reinforcing said tread portion, said breaker strip comprising a flat band formed of a single rubberized cord of inextensible filamentary material wound obliquely in a zig-zag manner from one side of the band to the other in spaced formation to form a reticulated structure, the angle of said filamentary material to the circumferential center line of said band being less in the central zone than in the zones between the central zone and the respective edges of said band.

2. A tread reinforcement for a pneumatic tire comprising a continuous cylindrical shaped band formed from convolutions of a single rubberized cord of filamentary material progressively wound obliquely in continuous lengths from one side of the band to the other and back in zig-zag formation, successive convolutions being slightly displaced so that a continuous band is formed, each length of the zig-zag formation which extends from one side of the band to the other in the case of all of the convolutions excepting the first and last convolutions extending partially over and partially under lengths inclined in the opposite direction and each of the lengths of material being inclined to the mid-circumferential line of the band at one angle in the central zone of the reinforcement and at a higher angle than said angle in zones between said central zone and the respective edges of the band.

3. A pneumatic tire tread reinforcement according to claim 2 wherein each end of each of the continuous lengths prior to the forming operation is inclined at substantially 28°, the center portions thereof then being inclined at 22° to a circumferential line.

4. A pneumatic tire tread reinforcement according to claim 2 wherein the filaments are of steel cord.

5. A pneumatic tire having a tread portion and a breaker strip reinforcing said tread portion, said breaker strip comprising a band formed from convolutions of a filamentary material progressively wound obliquely in continuous lengths from one side of the band to the other and back in zig-zag formation, successive convolutions being slightly displaced so that a continuous band is formed, each length of the zig-zag formation which extends from one side of the band to the other in the case of all of the convolutions excepting the first and last convolutions extending partially over and partially under lengths inclined in the opposite direction and each of the lengths of material being inclined to the mid-circumferential line of the tire at one angle in the central zone of the reinforcement and at a higher angle than said angle in zones between said central zone and the respective edges of the band.

References Cited in the file of this patent

UNITED STATES PATENTS

| | | |
|---|---|---|
| 537,536 | La Force | Apr. 16, 1895 |
| 1,201,257 | Cobb | Oct. 17, 1916 |
| 1,366,220 | Swinehart | Jan. 18, 1921 |
| 1,420,611 | Dickinson | June 20, 1922 |
| 1,422,046 | Fording | July 4, 1922 |
| 1,462,453 | Lerch | July 17, 1923 |
| 1,759,410 | Marston | May 20, 1930 |
| 2,541,506 | Cuthbertson et al. | Feb. 13, 1951 |
| 2,700,998 | Wallace | Feb. 1, 1955 |
| 2,811,191 | Comstock | Oct. 29, 1957 |
| 2,943,663 | Antonson | July 5, 1960 |

FOREIGN PATENTS

| | | |
|---|---|---|
| 513,800 | Italy | Feb. 7, 1955 |